United States Patent [19]
Cullen et al.

[11] Patent Number: 5,894,725
[45] Date of Patent: Apr. 20, 1999

[54] METHOD AND APPARATUS FOR MAINTAINING CATALYST EFFICIENCY OF A $NO_x$ TRAP

[75] Inventors: Michael John Cullen, Northville; David George Farmer, Plymouth, both of Mich.

[73] Assignee: Ford Global Technologies, Inc., Dearborn, Mich.

[21] Appl. No.: 08/824,628

[22] Filed: Mar. 27, 1997

[51] Int. Cl.$^6$ ................................................. F01N 3/00
[52] U.S. Cl. ........................ 60/274; 60/285; 60/301
[58] Field of Search .......................... 60/274, 285, 286, 60/295, 297, 301

[56] References Cited

U.S. PATENT DOCUMENTS

| | | |
|---|---|---|
| 5,189,876 | 3/1993 | Hirota et al. . |
| 5,233,830 | 8/1993 | Takeshima et al. . |
| 5,402,641 | 4/1995 | Katoh et al. . |
| 5,412,945 | 5/1995 | Katoh et al. . |
| 5,423,181 | 6/1995 | Katoh et al. .............. 60/285 X |
| 5,433,074 | 7/1995 | Seto et al. ................. 60/301 X |
| 5,437,153 | 8/1995 | Takeshima et al. ......... 60/285 X |
| 5,448,887 | 9/1995 | Takeshima et al. ......... 60/285 X |
| 5,450,722 | 9/1995 | Takeshima et al. ............ 60/285 |
| 5,472,673 | 12/1995 | Goto et al. ................ 60/285 X |
| 5,473,887 | 12/1995 | Takeshima et al. ......... 60/285 X |
| 5,473,890 | 12/1995 | Takeshima et al. ............ 60/285 |
| 5,544,482 | 8/1996 | Matsumoto et al. ......... 60/297 X |
| 5,595,060 | 1/1997 | Togai et al. ............... 60/301 X |
| 5,713,199 | 2/1998 | Takeshima et al. ......... 60/301 X |
| 5,743,084 | 4/1998 | Hepburn ...................... 60/274 |
| 5,746,049 | 5/1998 | Cullen et al. ................. 60/274 |
| 5,758,493 | 6/1998 | Asik et al. ................. 60/297 X |
| 5,822,979 | 10/1998 | Hamburg et al. ............... 60/274 |

FOREIGN PATENT DOCUMENTS

| | | |
|---|---|---|
| 0598917 A1 | 6/1993 | European Pat. Off. . |
| 0627548 A1 | 5/1994 | European Pat. Off. . |
| 0713959 A2 | 11/1995 | European Pat. Off. . |
| 19607151 C1 | 7/1997 | Germany . |

*Primary Examiner*—John E. Ryznic
*Attorney, Agent, or Firm*—Allan J. Lippa; Roger L. May

[57] ABSTRACT

An engine control computer estimates the cumulative $NO_x$ storage in a $NO_x$ trap based on engine operating conditions and enters a $NO_x$ purge mode of operation when a maximum storage capacity limit, based on trap temperature, is exceeded. The purge mode is terminated when $NO_x$ storage level decreases below a minimum storage capacity limit. The rate of $NO_x$ dissipation is also based on trap temperature.

16 Claims, 5 Drawing Sheets

METHOD AND APPARATUS FOR MAINTAINING CATALYST EFFICIENCY OF A $NO_x$ TRAP

TECHNICAL FIELD

This invention relates to vehicle emissions control and, more particularly, to a method and apparatus for maintaining the efficiency of a $NO_x$ trap by purging the trap when predetermined conditions exist indicating a fully adsorbed trap.

BACKGROUND ART

Conventional lean burn engine control systems include an air/fuel controller that delivers fuel to the engine intake proportional to measured air mass to maintain a desired air/fuel, lean of stoichiometric. The typical three-way catalytic converter provided in the engine exhaust passage does not convert the $NO_x$ produced while running lean and in order to reduce $NO_x$ emission to the atmosphere, it has been proposed to locate a $NO_x$ trap downstream of the three-way catalyst.

A typical $NO_x$ trap utilizes alkali metal or alkaline earth materials in combination with platinum in order to store or occlude $NO_x$ under lean operating conditions. The mechanisms for $NO_x$ storage involves the oxidation of NO to $NO_2$ over the platinum followed by the subsequent formation of a nitrate complex with the alkaline metal or alkaline earth. Under stoichiometric operation or operation rich of stoichiometric, the nitrate complexes are thermodynamically unstable, and the stored $NO_x$ is released and catalytically reduced by the excess of CO, $H_2$, and hydrocarbons (HCs) in the exhaust.

Accordingly, in the prior art, the amount of $NO_x$ introduced to the trap since the last purge is estimated and when the trap is estimated to be full the engine is switched to a relatively rich air/fuel to purge the $NO_x$ trap. After a predetermined purge time interval, the engine is returned to lean operation. The prior art relies on engine speed to determine $NO_x$ accumulation, see for example U.S. Pat. No. 5,473,887. However, engine speed alone does not provide an accurate estimation of $NO_x$ accumulation since several other variables that affect $NO_x$ accumulation are different at the same engine speed depending on other engine operating condition, thereby causing wide swings in the rate of $NO_x$ accumulation. It is important to obtain as accurate an estimate of $NO_x$ accumulation as possible since underestimation will permit lean operation to continue after the trap is full and tailpipe $NO_x$ emission will result. On the other hand overestimation of the accumulated $NO_x$ will cause purging at a rich A/F at a higher frequency than required, reducing fuel economy.

SUMMARY OF THE INVENTION

In view of the above, it is an object of the present invention to provide a highly accurate method and apparatus for determining when a $NO_x$ trap must be purged of accumulated $NO_x$ and when the trap is sufficiently purged of $NO_x$ to permit a return to a lean mode of engine operation.

In accordance with the present invention, the engine control computer estimates $NO_x$ accumulation in the trap based on calculated feed gas emissions generated by the engine to obtain a rate of entry of emissions into the $NO_x$ trap. The entry rate is integrated over time until a $NO_x$ trap maximum capacity level is reach. The capacity level is a function of $NO_x$ trap temperature. When the capacity level is reached, the engine is switched from a lean to a rich mode of operation in order to purge the accumulated $NO_x$. During purging, the estimated rate of $NO_x$ dissipation is also based on trap temperature and purging is terminated when $NO_x$ storage level decreases below a minimum storage capacity limit.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
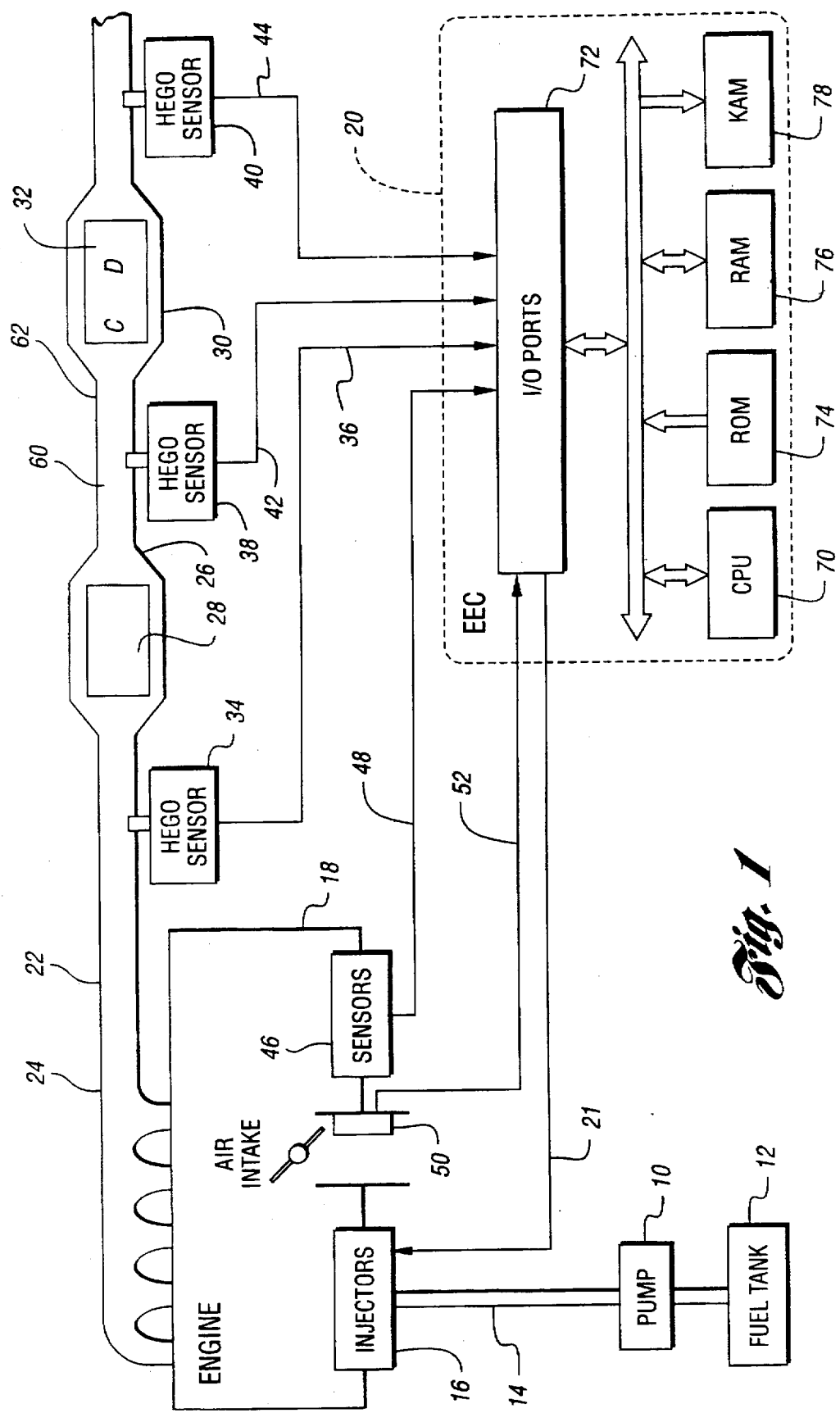
FIG. 1 is a block diagram of a vehicle engine and an electronic engine controller which embodies the principles of the invention.

Referring now to the drawings, and initially to FIG. 1, a fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20. The EEC 20 transmits a fuel injector signal to the injectors 16 via signal line 21 to maintain an air/fuel determined by the EEC 20. The fuel tank 12 contains liquid fuels, such as gasoline, methanol or a combination of fuel types. An exhaust system 22, comprising one or more exhaust pipes and an exhaust flange 24, transports exhaust gas produced from combustion of an air/fuel mixture in the engine to a conventional three-way catalytic converter 26. The converter 26, contains a catalyst material 28 that chemically alters exhaust gas that is produced by the engine to generate a catalyzed exhaust gas.

The catalyzed exhaust gas is fed to a downstream $NO_x$ trap 32 composed of material of the type previously described. The trap 32 is contained in a housing generally indicated at 30. A heated exhaust gas oxygen (HEGO) sensor 34, detects the oxygen content of the exhaust gas generated by the engine 18, and transmits a signal over conductor 36 to the EEC 20. A pair of HEGO sensor 38 and 40 are located upstream and downstream respectively of the trap 32, and provide signals to the EEC 20 over conductors 42 and 44, respectively. Still other sensors, indicated generally at 46, provide additional information about engine performance to the EEC 20, such as crankshaft position, angular velocity, throttle position, air temperature, etc. The information from these sensors is used by the EEC 20 to control engine operation.

A mass air flow sensor 50 positioned at the air intake of engine 18 detects the amount of air inducted into an induction system of the engine and supplies an air flow signal over conductor 52 to the EEC 20. The air flow signal is utilized by EEC 20 to calculate an air mass (AM) value which is indicative of a mass of air flowing into the induction system in lbs./min.

The EEC 20 comprises a microcomputer including a central processor unit (CPU) 70, input and output (I/O) ports 72, read only memory (ROM) 74 for storing control programs, random access memory (RAM) 76, for temporary data storage which may also be used for counters or timers, and keep-alive memory (KAM) 78 for storing learned values. Data is communicated over a conventional data bus as shown. The EEC 20 also includes an engine off timer that provides a record of the elapsed time since the engine was last turned off as a variable "soak time".

Figure 2:
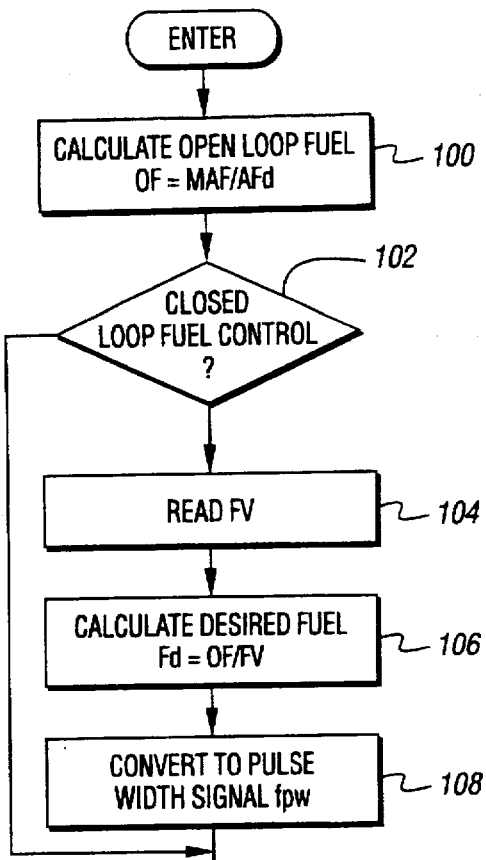
FIGS. 2, and 3 are high level flowcharts of conventional engine fuel control schemes.

The liquid fuel delivery routine executed by controller 20 for controlling engine 18 is shown in the flowchart of FIG. 2. An open loop calculation of desired liquid fuel is calculated at block 100. More specifically, the measurement of inducted mass air flow (MAF) from sensor 50 is divided by a desired air/fuel ratio (AFd) which in this example, is correlated with stoichiometric combustion. At decision block 102, a determination is made whether closed loop feedback control is desired, by monitoring engine operating parameters such as engine coolant temperature. Fuel command or desired fuel signal Fd is generated by dividing feedback variable FV, read at block 104, into the previously generated open loop calculation of desired fuel in block 106. Desired fuel signal Fd is then converted to a pulse width signal fpw at block 108 for actuating fuel injector 16, thereby delivering fuel to engine 18 in relation to the magnitude of the desired fuel signal Fd.

Figure 3:
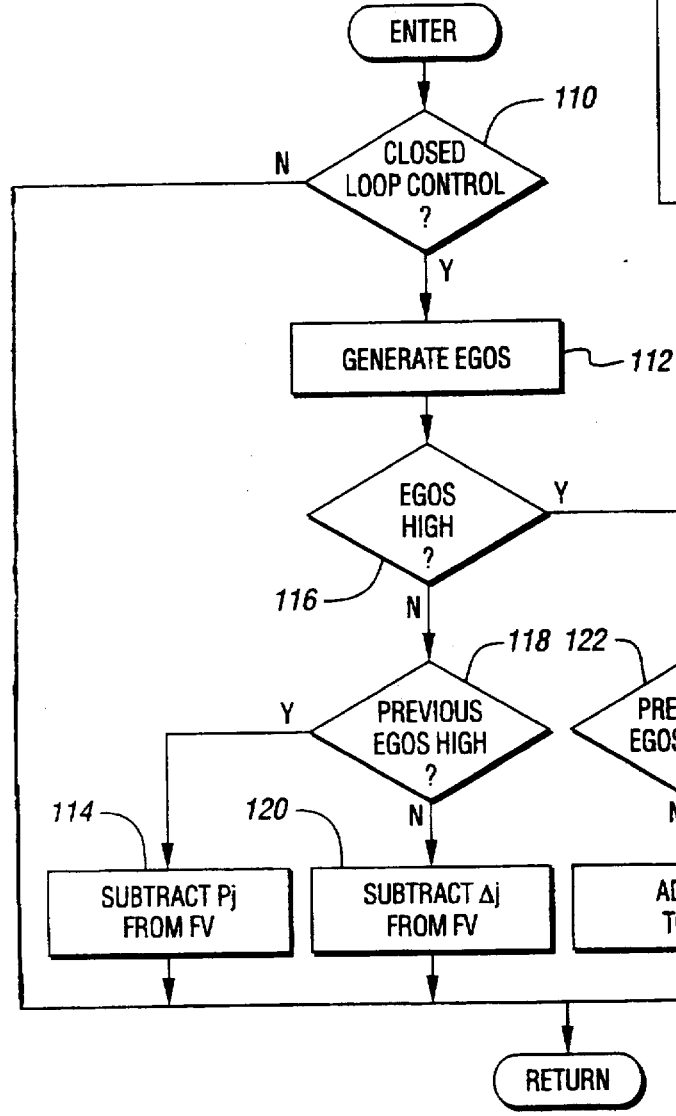

The air/fuel feedback routine executed by controller 20 to generate fuel feedback variable FV is shown in the flowchart in FIG. 3. Under closed loop control as determined at block 110, a two-state signal EGOS is generated at block 112 from the signal provided by the sensor 34. Predetermined proportional term Pj is subtracted from feedback variable FV at block 114 when the signal EGOS is low, but was high during the previous background loop of controller 20 as determined at decision blocks 116 and 118. When signal ECOS is low and was also low during the previous background loop, predetermined integral term $\Delta j$ is subtracted from feedback variable FV at block 120.

On the other hand, when signaL EGOS is high and was also high during the previous background loop of controller 20, as determined at decision blocks 116 and 122, integral term $\Delta i$ is added to feedback variable FV at block 124. When signal EGOS is high but was low during the previous background loop, proportional term Pi is added to feedback variable FV at block 126.

Figure 5:
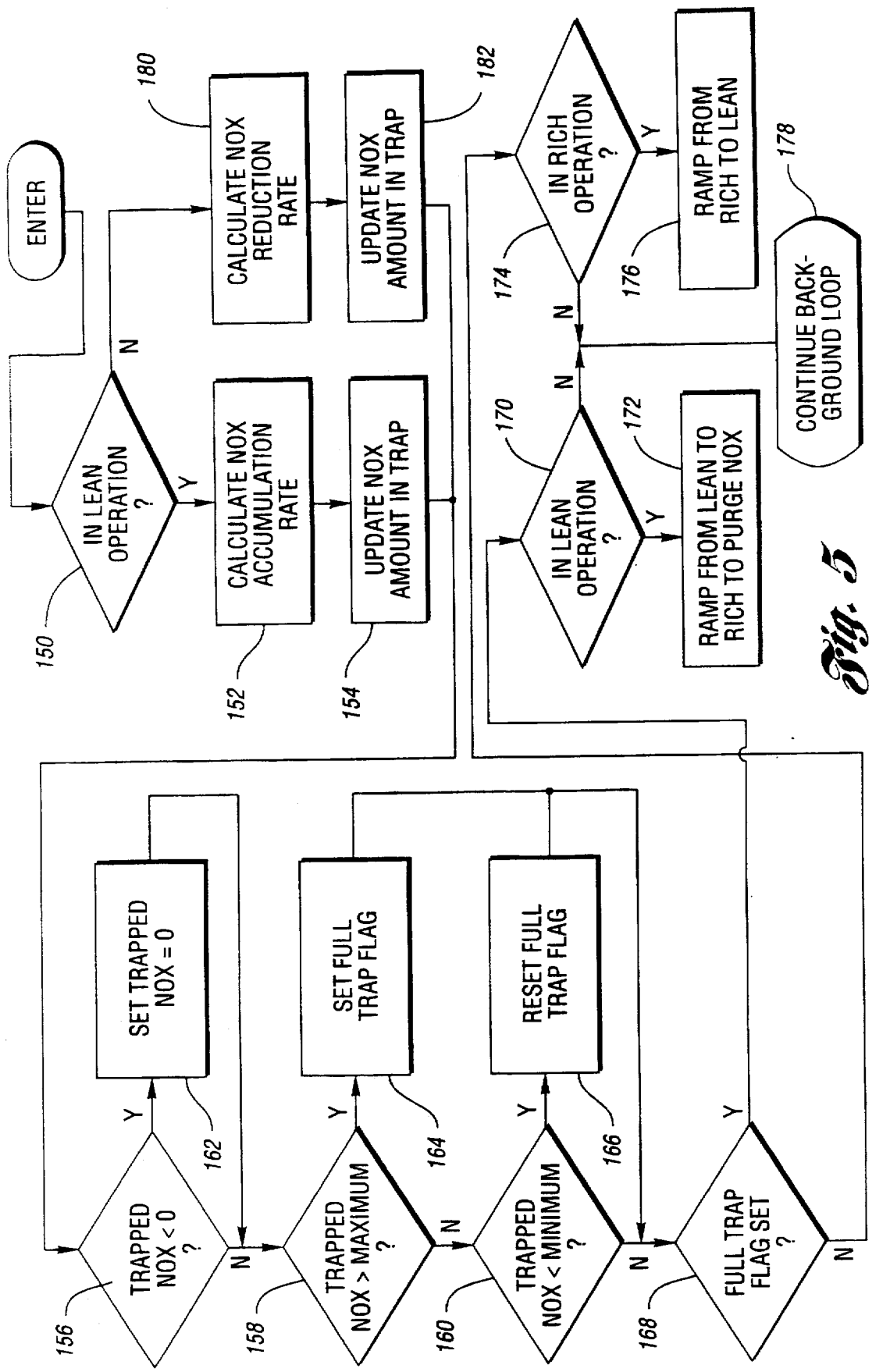
FIG. 5 is an high level flowchart of the $NO_x$ purging scheme of the present invention.

Referring now to FIG. 5, control of the mode of engine operation is depicted. Vehicle operating conditions required in order to switch to a lean cruise mode of operation include such conditions as vehicle speed above a predetermined value or throttle position above a predetermined value. Whether the vehicle has been placed in a lean mode of operation is checked at block 150. In general, during the lean cruise mode, air/fuel operation proceeds open loop at a predetermined value such as 19 lb air/lb fuel for enhanced fuel economy. During lean cruise, $NO_x$ trapping material 32 will store nitrogen oxides passing through catalytic converter 26. When the maximum capacity of the trap material 32 is reached, the material 32 must be purged of stored nitrogen oxides by operating the engine at an air/fuel rich of stoichiometric. Lean cruise operation will continue, once established unless the material 32 exceeds a predetermined maximum capacity. Once this capacity is exceeded, the mode of operation switches from lean to rich and the $NO_x$ stored in the trap is converted to inert gas and released to the atmosphere.

Figure 4A:
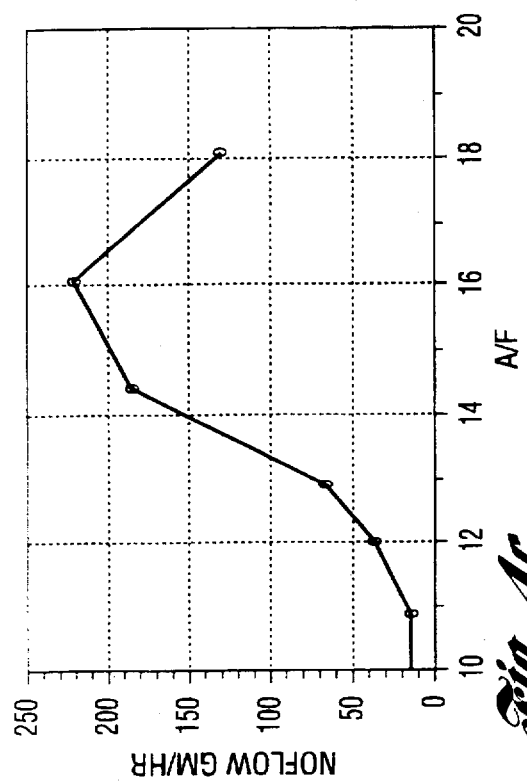
FIGS. 4a–4d are plots of $NO_x$ flow versus various engine operating conditions.

As long as the engine is operating in a lean mode as determined by block 152, the rate of $NO_x$ accumulation in the trap is calculated on the basis of engine operation conditions. The incremental or delta feed gas emissions from the engine, in grams/hr, generated since the last time through this loop, is preferably expressed by the following relationship.

$$FG\_NO_x\_RATE=FNXXX1(N, LOAD)*FNXXB(EGRACT)*FNXXA(LAMBSE)*FNXXC(SPK\_DELTA)*FMXXD(ECT-200)$$

where:

FNXXX1(N,LOAD) is a look-up table containing $NO_x$ emission rate values in gram/hr for present engine speed N and LOAD. At a given engine speed the LOAD, or air charge, in an engine varies according to the transmission gear number, road grade, presence of a trailer or luggage, wind speed and direction. The plot in FIG. 4a shows the variation in $NO_x$ flow versus LOAD at a constant engine speed.

Figure 4C:
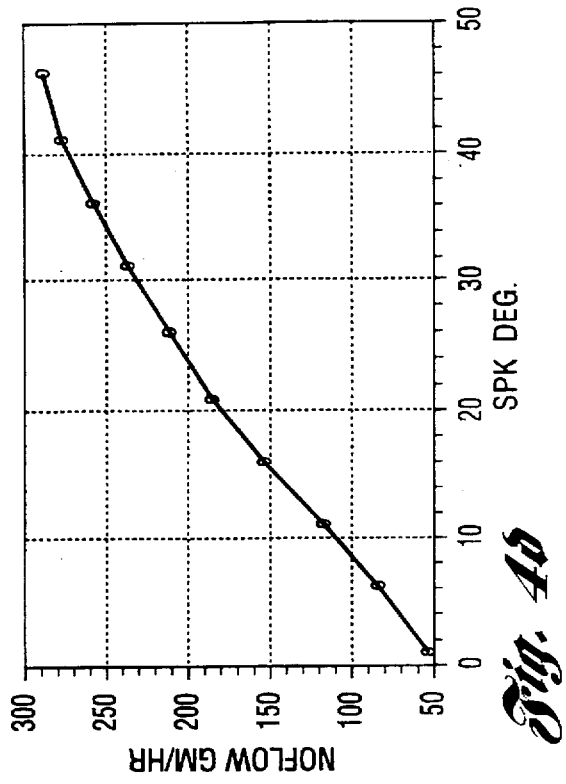
Figure 4D:
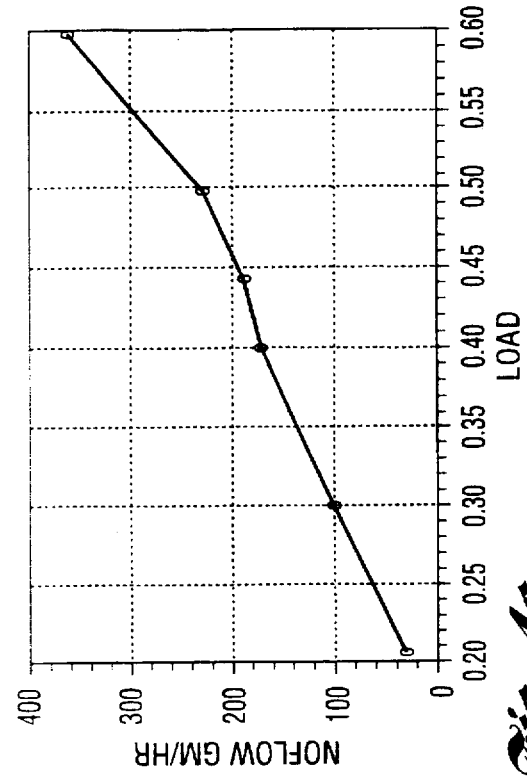
Figure 4B:
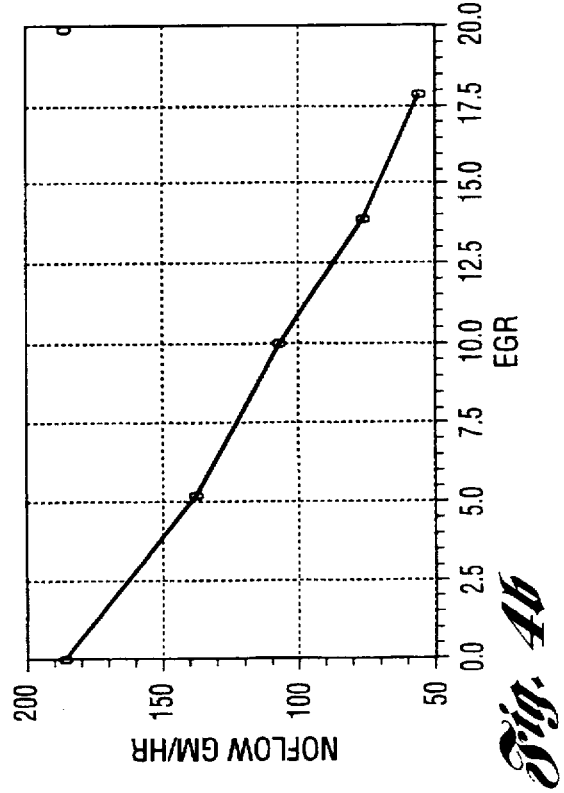

FNXXB(EGRACT) is a look-up table for adjusting the FG\_$NO_x$\_RATE value for actual exhaust gas recirculation percentage. At a given engine speed the amount of EGR varies for all of the reasons LOAD varies and further varies with altitude. At high altitude, EGR is reduced at high LOADs in order to allow more air into the engine at a given manifold pressure. It is quite reasonable to vary EGR with altitude but maintain the lean operation for fuel economy. Properly modeled, the $NO_x$ trap accumulator will maximize lean operation while protecting the environment. FIG. 4b shows the variation in $NO_x$ flow with EGR at a constant speed and LOAD.

FNXXA(LAMBSE) is a look-up table for adjusting the FG\_$NO_x$\_RATE value for A/F which inherently adjusts the FG\_$NO_x$RATE value for barometric pressure. The desired A/F while in lean operation varies for all of the reasons LOAD varies as discussed above and at a give LOAD varies with altitude. After the EGR is blended out, the A/F is progressively enriched to maintain to maintain a required torque. As enrichment occurs $NO_x$ production first increases and then decreases as one approaches stoichiometric A/F. FIG. 4c shows the variation in $NO_x$ flow with A/F at a constant speed, LOAD and 0% EGR.

FNXXC(SPK\_DELTA) is a look-up table for adjusting the FG\_$NO_x$\_RATE value for the effect of knock sensor or hot open loop induced spark retard. This variable is equal to MBT spark minus actual spark. Actual spark is retarded at elevated ambient temperatures and or engine coolant temperature in order to prevent engine knock. Under such situations $NO_x$ production is reduced. The fuel economy loss associated with spark retard can be partially offset by purging less often since the trap fills at a slower rate. FIG. 4d shows $NO_x$ flow versus spark advance.

FMXXD(ECT-200) is a look-up table for adjusting the $FG_x$\_$NO_x$\_RATE value for the effect of engine coolant temperature above 200° degrees F.

The rate of $NO_x$ trap entry emissions, may be expressed as:

$$TRAP\_NO_x\_RATE=(1-FNXXE(LAMSE))*FG\_NO_x\_RATE$$

where:

FNXXE(LAMSE) is a look-up table of 3-way catalytic converter efficiency, in percent, in reducing $NO_x$ as a function of A/F.

At block 154, the cumulative amount of $NO_x$ stored in the trap is updated by adding the incremental amount of $NO_x$ stored during this background loop to the amount previous stored and may be expressed as:

$$TRAP\_NO_x\_GRAMS(Present)=TRAP\_NO_x\_GRAMS(Previous)+(TRAP\_NO_x\_RATE*BG\_TMR/3600)$$

where $BG_{13}$ TMR is the background loop time in seconds.

After updating the amount of stored $NO_x$ the amount is first checked at block 156 to see if the amount is a negative number. If not, at block 158 the amount is checked to determined if it exceeds a maximum trap capacity. If not, at block 160 the amount is checked to determined if it is less than a trap capacity that indicates purging has progressed sufficiently to return to lean operation.

If at block 156 the amount if negative, the amount is set to zero at block 162, If the amount exceeds the maximum trap capacity, as determined in block 158, a $NO_x\_FULL\_FLAG$ is set at block 164. If the amount is less than the minimum amount to return to lean operation, as determined in block 160, the $NO_x\_FULL\_FLAG$ is reset at block 166.

The function performed in block 158 may be expressed as:

TRAP_$NO_x$_GRAMS>MAX_$NO_x$_GRAMS where:

MAX_$NO_x$_GRAMS is the threshold level of stored grams of $NO_x$, above which lean operation must be terminated and a $NO_x$ purge must begin and may be expressed as:

MAX_$NO_x$_GRAMS=FNXXF(EXT_$NO_x$_TRAP)

where:

FNXXF (EXT_$NO_x$_TRAP) is a look-up table providing maximum trap capacity as a function of trap temperature.

The function performed in block 160 may be expressed as:

TRAP_$NO_x$_GRAMS<MIN_$NO_x$_GRAMS where:

MIN_$NO_x$_GRAMS is the threshold level of stored grams of $NO_x$, below which a lean operation can be resumed.

At block 168 the $NO_x\_FULL\_FLAG$ is checked. If the flag is set and the engine is being operated in the lean mode as determined by block 170, the A/F is ramped from lean to rich, as indicated at block 172, to begin purging the trap 32 of $NO_x$. If the flag is reset and the engine is being operated in the rich mode as determined by block 174, the A/F is ramped from rich to lean, as indicated at block 176, to terminate purging of the trap 32 and return to lean operation. Otherwise, the mode of operation continues as indicated at 178.

During lean operation, feedback variable FV is generated in an open loop manner to provide lean air/fuel engine operation. More specifically feedback variable FV is generated by reading a look-up table value as a function of engine speed and load and multiplying the table value by a multiplier LMULT. The resulting product is then added to unity which is the stoichiometric air/fuel reference. Multiplier LMULT, which varies between 0 and unity, is gradually incremented to ramp engine air/fuel operation to a desired lean air/fuel. Feedback variable FV is thereby generated which is an indication of desired air/fuel.

During rich operation, feedback variable FV is generated in an open loop manner to provide rich air/fuel engine operation. More specifically, feedback variable FV is generated by reading a look-up table value as a function of engine speed and load and multiplying the table value by a multiplier RMULT. The resulting product is then added to unity which is the stoichiometric air/fuel reference. Multiplier RMULT, which varies between 0 and unity, is gradually incremented to ramp engine air/fuel operation to a desired rich air/fuel. Feedback variable FV is thereby generated which is an indication of desired air/fuel.

If at block 150, the engine is operating in a rich mode, the rate of reduction in $NO_x$ resulting from this mode of engine operation is determined at block 180. In this mode, the feed gas $NO_x$ is ignored since the efficiency of the 3-way catalyst is high and therefore little $NO_x$ reaches the $NO_x$ trap. The rate of dissipation is a function of the $NO_x$ trap temperature and the inlet A/F. This rate is multiplied by the mass air flow estimate. The functions performed by the block 180 may be expressed as follows:

TRAP_$NO_x$_DIS_RATE=$AM*FNXXG(LAMBSE,EXT\_NO_x\_TRAP)$ where:

AM is the mass air flow estimate;
LAMBSE is the inlet A/F; and
EXT_$NO_x$_TRAP is the temperature of the $NO_x$ trap.

The amount of $NO_x$ purged from the trap since the last background loop may be expressed as:

TRAP_$NO_x$_PUR=TRAP_$NO_x$_DIS_RATE*BG_TMR/3600

The amount of $NO_x$ remaining in the trap is calculated in block 182 and may be expressed as:

TRAP_$NO_x$_GRAMS=TRAP_$NO_x$_GRAMS-TRAP_$NO_x$_PUR

The purging operation continues until at block 160, the TRAP_$NO_x$_GRAMS value is reduced to a predetermined minimum $NO_x$ level. When this value is attained, the $NO_x\_FULL\_FLAG$ is reset at block 166. If $NO_x\_FULL\_FLAG$ is reset as indicated by block 168 while the engine is in a rich mode of operation as indicated by block 174, the A/F is ramped from a rich to a lean mode of engine operation as indicated by the block 176. Otherwise, the background loop is continued as indicated at 178.

The temperature of the $NO_x$ trap is a factor in the determination of the rate of dissipation of $NO_x$ during purging. While trap temperature can be determined by a properly located sensor, preferably, $NO_x$ trap temperature is inferred in accordance with the flowchart depicted in FIG. 6.

Figure 6:
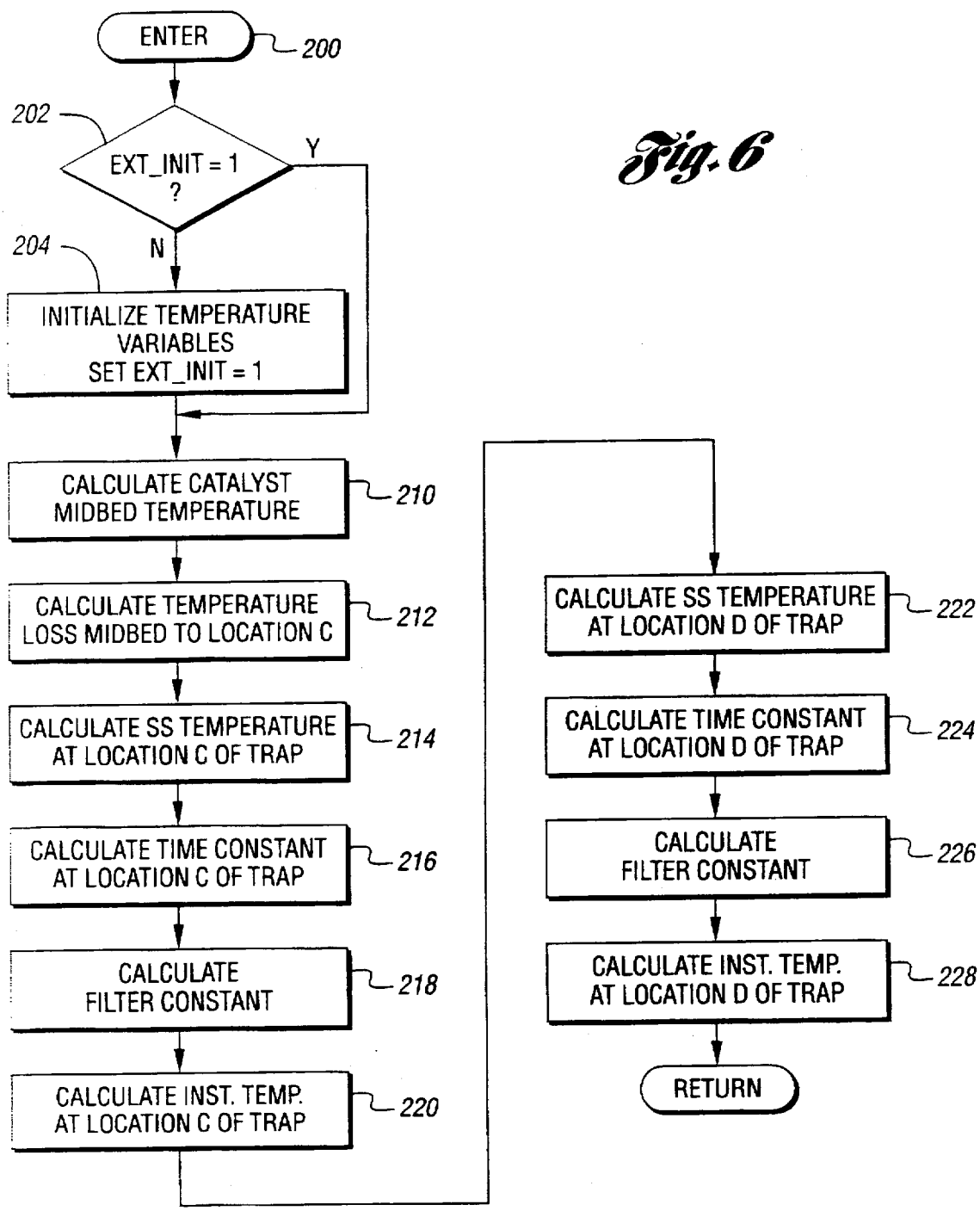
FIG. 6 is a detailed flowchart of a method of inferring the temperature of the $NO_x$ trap.

Referring now to FIG. 6, a flowchart depicting the steps in a routine performed by the EEC 20 for inferring $NO_x$ trap temperature is shown. The temperature determination routine is entered at 200 and at 202 an initialization flag EXT_INIT is checked to determine if certain temperature variables have been initialized. If not, the temperature variables are initialized at 204, after which the flag EXT_INIT is set to 1. A preferred embodiment advantageously initializes certain temperature variables in a manner to account for instances where an engine may be turned off for short periods of time in which the $NO_x$ trap 32 may not have cooled to ambient temperature. $NO_x$ trap over temperature conditions are accordingly avoided by estimating $NO_x$ trap temperature upon engine ignition as a function of estimated $NO_x$ trap temperature upon engine shut-off, ambient temperature, a calibratable time constant indicative of $NO_x$ trap cooling and the time elapsed from engine shut-off to subsequent engine operation. The initialization of the temperature at locations "C" and "D" is accomplished in accordance with the following Equations 1, and 2.

$$ext\_ntC\_init=((ext\_ntC\_prev-infamb)*fnexp(-soaktime/tc\_))+infamb \quad (1)$$

$$ext\_ntD\_init=ext\_ntC\_init \quad (2)$$

where:

fnexp is a look-up table value that approximates an exponential function,
soaktime=time since engine was shut down in seconds,
tc_ntC=an empirically derived time constant associated with the cooling off of the exhaust gas at an identified location such as "C", in seconds, and
infamb=inferred ambient temperature.

Ambient temperature may be inferred as indicated above or measured with a sensor. When ambient temperature is inferred (infamb), the value stored in keep-alive memory 78 and is initialized at block 204. If the absolute difference between air charge temperature (ACT) and engine coolant temperature (ECT) is within a calibratable tolerance, usually about 6 degrees, it may be assumed that the engine is at equilibrium or ambient temperature and therefore that ambient temperature is equal to ACT. Otherwise, ambient temperature is assumed to be smaller of the last known ambient temperature in KAM 78 or ACT.

If the engine is running and if engine coolant temperature and vehicle speed are above minimum values, then a steady-state forcing function is calculated as ACT-$\Delta$, where $\Delta$ is about 10 degrees F. if the air conditioning clutch is not engaged and is about 20 degrees F. if the air conditioning clutch is engaged. Normally, the forcing function is filtered by a rolling average, but if ACT is ever less than inferred ambient, then infamb is set to ACT immediately.

At block 210, the instantaneous midbed temperature of the catalytic converter 26 is calculated in accordance with the disclosure in U.S. Pat. No. 5,414,994, assigned to the assignee of the present invention and incorporated herein by reference.

At block 212, the temperature loss in the exhaust passage between the midbed of the catalytic converter 26 and the entrance to the $NO_x$ trap 32 is calculated in accordance with Equation 3.

$$ext\_ls\_ntC = FNLS\_NTC(am) * [(ext\_cmd + ext\_ntC\_prev)/2 - infamb] \quad (3)$$

where:

FNLS_NTC(am) is a unitless value, contained in a table indexed by mass air flow (am), which is indicative of a temperature drop between the catalytic converter and location "C" as a function of (am), ext_cmd=instantaneous converter catalyst midbed temperature calculated in block 210, and ext_ntC_prev=value of ext_ntC for the previous loop.

At block 214, the steady-state $NO_x$ trap inlet temperature is calculated, in accordance with Equation 4.

$$ext\_ss\_ntC = ext\_cmd - ext\_ls\_ntC \quad (4)$$

This temperature is determined by subtracting the temperature loss, calculated at block 212, from the catalyst midbed temperature, calculated at block 210.

At block 216, the time constant of the temperature rise at the trap inlet is a function of air mass flow and is evaluated in accordance with Equation 5.

$$tc\_ntC\_run = FNTC\_NTC(am) \quad (5)$$

where:

FNTC_NTC(am)=ROM calibration data table value of time constant, in seconds, indexed by air mass.

At block 218, a filter constant that performs an exponential smoothing function is calculated from the time constant determined at block 216 in accordance with Equation 6.

$$fk\_ntC = 1/(1 + tc\_ntC\_run/bg\_tmr) \quad (6)$$

where:

bg_tmr is the time, in seconds, for execution of the background loop.

At block 220, the instantaneous $NO_x$ trap inlet temperature at location "C" is calculated in accordance with Equation 7, from the previous value, the new steady-state value, and the filter constant.

$$ext\_ntC = fk\_ntC * ext\_ss\_ntC + (1 - fk\_ntC) * ext\_ntC\_prev \quad (7)$$

where:

ext_ntC_prev=previous value of inlet temperature.

At blocks 222 through 226, a temperature which is more representative of an average temperature of the trap 32 is calculated. At block 222, the steady-state average temperature of the trap 32 is calculated in accordance with Equation 8, which is based on the assumption that there is no temperature drop from the location "C" to the location "D" and, therefore, at steady-state the two temperatures are equal.

$$ext\_ss\_ntD = ext\_ntC \quad (8)$$

There is a time constant as a function of air mass which causes the temperature at location "D" to lag the temperature at location "C". This time constant is due to the thermal capacitance of the trap substrate and trap material. At block 224, the time constant at location "D" in the trap is evaluated in accordance with Equation 9. This time constant is a function of the total air flow.

$$tc\_ntD\_run = FNTC\_NTD(am) \quad (9)$$

A filter constant is calculated at block 226 from the time constant in accordance with Equation 10.

$$fk\_ntD = 1/(1 + tc\_ntD\_run/bg\_tmr) \quad (10)$$

Finally, the instantaneous average temperature of the trap 32 is calculated at block 228 in accordance with Equation 11 from the previous value, new steady-state value, and the filter constant.

$$ext\_ntD = fk\_ntD * ext\_ss\_ntD + (1 - fk\_ntD) * ext\_ntD\_prev \quad (11)$$

Preferable, the estimated temperature at "D" is used in calculating, in block 180, the amount of $NO_x$ that is purged from the trap during each background loop calculation.

While the best mode for carrying out the present invention has been described in detail, those familiar with the art to which this invention relates will recognize various alternative designs and embodiments for practicing the invention as defined by the following claims.

What is claimed is:

1. A method of maintaining the efficiency of a $NO_x$ trap located in an exhaust passage of an engine, downstream from a catalytic converter, comprising a sequence of the steps of:

determining the temperature of said trap;

determining an incremental rate of $NO_x$ emissions from said engine as a function of engine speed and air charge;

determining the product of said rate and the elapsed time since the previous calculation to obtain an incremental amount of $NO_x$ emitted since the previous calculation;

determining the efficiency of said converter;

multiplying said incremental amount of $NO_x$ emitted, by said calculated efficiency to obtain an incremental amount of $NO_x$ entering said trap;

adding said incremental amount of $NO_x$ entering said trap to a calculated amount of $NO_x$ previously stored in the trap to obtain a cumulative amount of $NO_x$ stored in said trap since a previous $NO_x$ purge;

determining a maximum $NO_x$ capacity threshold level as a function of determined trap temperature; and initiating a $NO_x$ purge operation when the cumulative amount of stored $NO_x$ stored in said trap exceeds said threshold level.

2. The method defined in claim 1 comprising the further step of:

terminating said purge operation when the amount of $NO_x$ remaining in said trap is less than a minimum capacity level.

3. The method defined in claim 2 wherein the rate of reduction of $NO_x$ during purge is equal to mass air flow multiplied by a value that is a function of trap temperature and A/F.

4. The method defined in claim 1 wherein said trap temperature is inferred from a mathematical model.

5. The method defined in claim 1 wherein said step of determining the incremental rate of engine $NO_x$ emitted is further based on the desired A/F at the present engine speed and load.

6. The method defined in claim 5 wherein said step of determining the present rate of engine $NO_x$ emissions is further based on the value of actual exhaust gas recirculation.

7. The method defined in claim 6 wherein said step of determining the present rate of engine $NO_x$ emissions is further based on the amount of spark retard.

8. The method defined in claim 7 wherein said step of determining the present rate of engine $NO_x$ emissions is further based on the engine coolant temperature.

9. An article of manufacture comprising:

a computer storage medium having a computer program encoded therein for controlling the amount of fuel supplied to an engine having an exhaust passage with a $NO_x$ trap located therein, said computer storage medium comprising:

code for determining the temperature of said trap;

code for calculating an incremental rate of $NO_x$ emitted from said engine as a function of engine speed and air charge;

code for determining the product of said rate and the elapsed time since a previous calculation to obtain an incremental amount of $NO_x$ emitted since the previous calculation;

code for calculating the efficiency of said converter;

code for multiplying said incremental amount by the calculated efficiency to obtain an incremental amount of $NO_x$ entering said trap;

code for adding said incremental amount of $NO_x$ entering said trap to the calculated amount of $NO_x$ previously stored in the trap to obtain a cumulative amount of $NO_x$ stored in said trap since the previous $NO_x$ purge;

code for calculating a maximum $NO_x$ capacity threshold level as a function of determined trap temperature; and code for initiating a $NO_x$ purge operation when the accumulated amount of stored $NO_x$ exceeds said threshold level.

10. The article defined in claim 9 wherein the incremental amount of $NO_x$ accumulated in said trap is a function of A/F, spark retard, engine coolant temperature, and percentage exhaust gas recirculation.

11. Apparatus for maintaining the efficiency of a $NO_x$ trap located in an exhaust passage of an engine, downstream from a catalytic converter, comprising:

a controller for determining a $NO_x$ trap temperature value;

said controller determining an incremental rate of $NO_x$ emitted from said engine as a function of engine speed and air charge;

said controller multiplying said rate by the elapsed time since the previous calculation to obtain an incremental amount of $NO_x$ emitted since a previous calculation;

said controller determining the efficiency of said converter;

said controller multiplying said incremental amount by the said efficiency to obtain an incremental amount of $NO_x$ entering said trap;

said controller adding said incremental amount of $NO_x$ entering said trap to a calculated amount of $NO_x$ previously stored in the trap to obtain a cumulative amount of $NO_x$ stored in said trap since the previous $NO_x$ purge;

said controller calculating a maximum $NO_x$ capacity threshold level as a function of the determined trap temperature value and initiating a $NO_x$ purge operation when the calculated cumulative amount of stored $NO_x$ exceeds said threshold level.

12. The apparatus defined in claim 11 wherein said controller terminates said purge operation when the amount of $NO_x$ remaining in said trap is less than a minimum capacity level.

13. The method defined in claim 12 wherein the rate of reduction of $NO_x$ during purge is equal to mass air flow multiplied by a value that is a function of trap temperature and A/F.

14. The apparatus defined in claim 12 wherein the rate of engine $NO_x$ emissions is further based on the desired A/F at the present engine speed and load.

15. The apparatus defined in claim 14 wherein the rate of engine $NO_x$ emissions is further based on the value of actual exhaust gas recirculation and the amount of spark retard.

16. The apparatus defined in claim 15 wherein the rate of engine $NO_x$ emissions is further based on the engine coolant temperature.

* * * * *